Patented Sept. 2, 1952

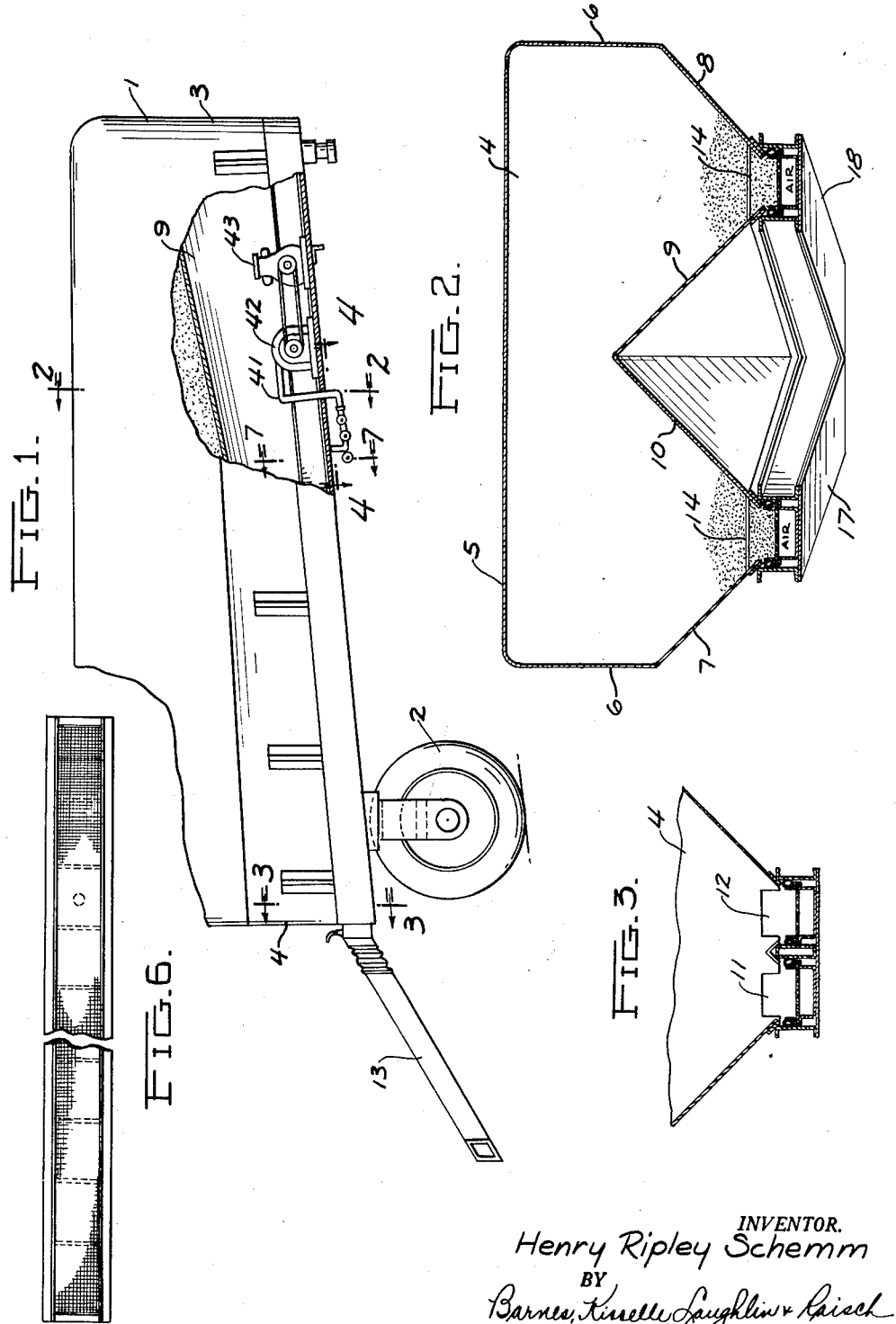

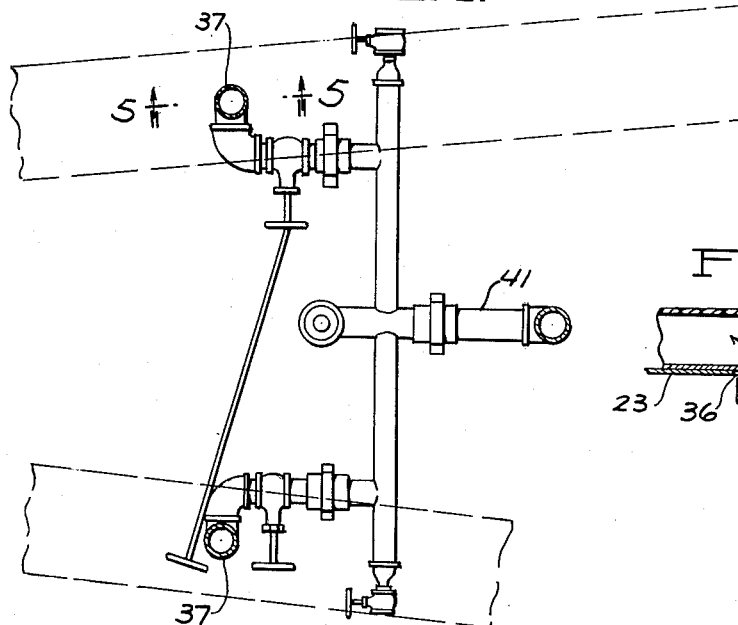
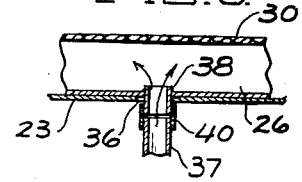
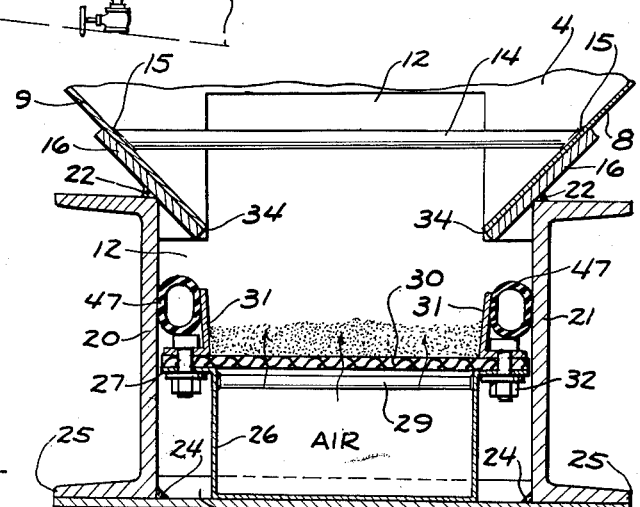
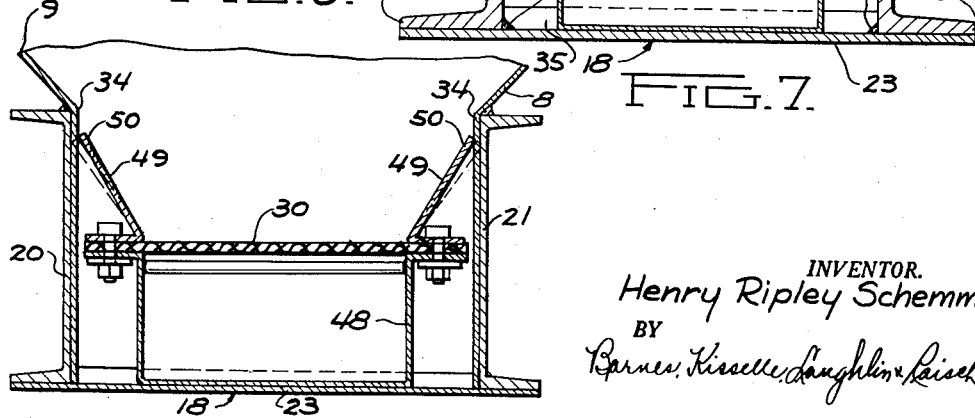
INVENTOR.
Henry Ripley Schemm
BY
ATTORNEYS

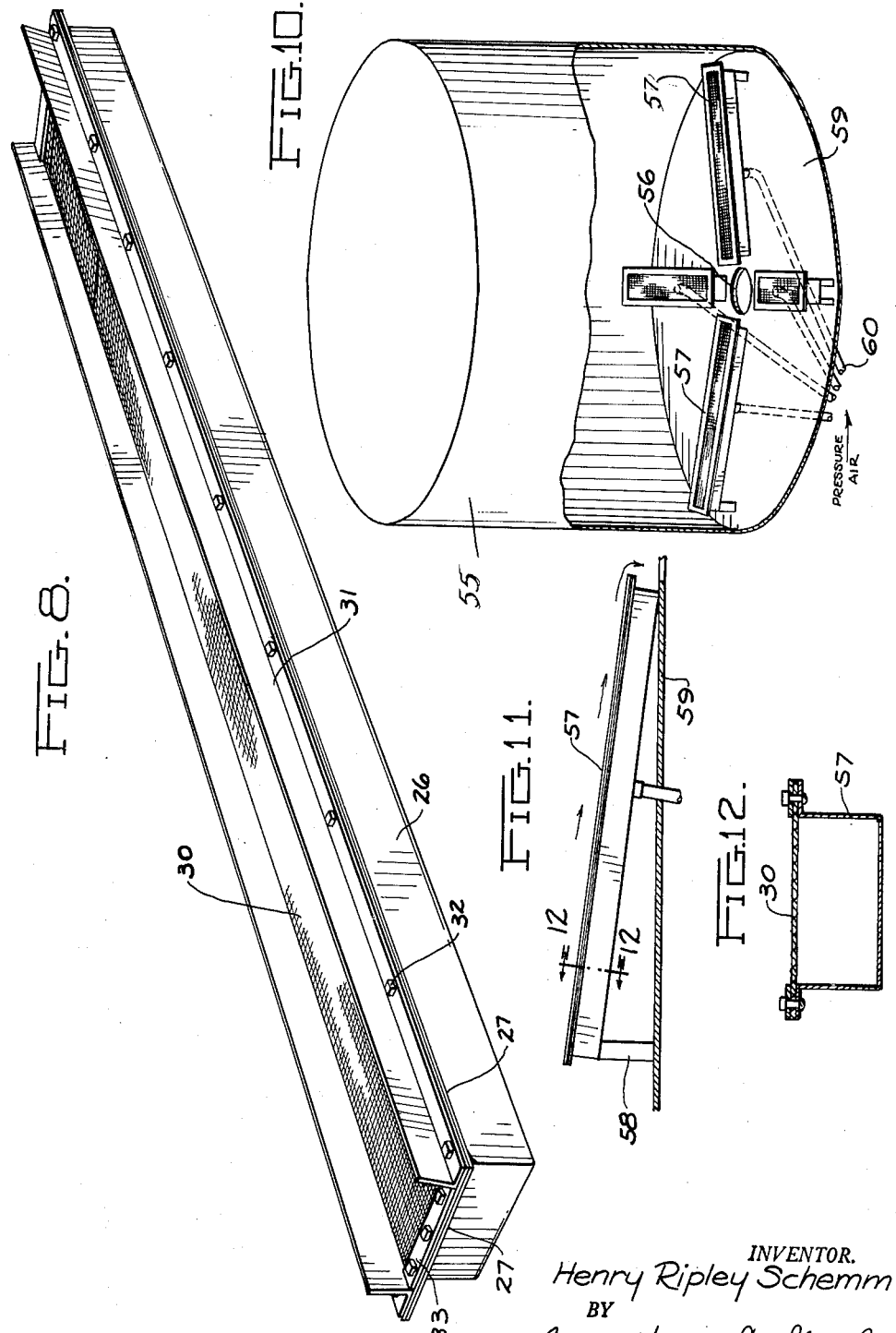

2,609,125

UNITED STATES PATENT OFFICE 2,609,125

SELF-UNLOADING BIN

Henry Ripley Schemm, Detroit, Mich., assignor to Huron Portland Cement Company, Detroit, Mich., a corporation of Michigan Application September 25, 1948, Serial No. 51,224

13 Claims. (Cl. 222—195)

This invention relates to a self-unloading bin for pulverulent material and in particular to a self-unloading bin wherein the pulverulent or powdered material, such, for example, as cement or flour, is aerated and while in an aerated condition flows by gravity out of the bin.

I have disclosed a self-unloading bin for pulverulent material in my prior copending application Serial No. 717,913, filed December 23, 1946, now Patent No. 2,589,968, wherein the aerator is an integral part of the bin structure. In my copending application the aerator comprises a web of canvas and a metal channel air duct with the web of canvas clamped between the bottom edge of the bin and the metal channel air duct which is bolted to the bottom of the bin. This aerator could only be removed with difficulty when in need of repair or replacement. Further, due to the fact that the aerator is an integral part of the bin structure, my prior bin did not have as high structural strength as is desirable, particularly where the bin is mobile.

This invention contemplates a self-unloading bin of the type under consideration wherein the aerator can be readily and easily installed or removed for repair.

It is also an object of this invention to produce a self-unloading bin for pulverulent material which is strong and moisture-proof. This object has been achieved by providing the aerator as an independent removable unit which does not constitute a structural strength and load bearing member of the bin and by constructing the bottom of the bin of high strength members integrally joined to the side walls of the bin.

By providing the aerator as a separate removable unit the bottom of the bin can be joined to the side walls of the bin with an air and water-proof joint which is highly desirable in the conveying by aeration of pulverulent or powdered materials. Such moisture-proofness is particularly essential in mobile bins, such as those mounted on trucks, trailers and vessels, and also in bins which are mounted outdoors and exposed to the weather.

Fig. 1 is a side elevation partly in section showing my self-unloading bin as a mobile trailer.

Fig. 2 is a vertical section along the line 2—2 of Fig. 1.

Fig. 3 is a section along the line 3—3 of Fig. 1.

Fig. 4 is a section along the line 4—4 of Fig. 1 showing the air lines for supplying the aerators with air under pressure.

Fig. 5 is a section along the line 5—5 of Fig. 4.

Fig. 6 is a top plan view showing my removable aerator unit.

Fig. 7 is a vertical section along the line 7—7 of Fig. 1.

Fig. 8 is a perspective view showing my removable aerator unit.

Fig. 9 is a vertical section corresponding to Fig. 7 but showing a modified form of aerator unit.

Fig. 10 is an elevation of a stationary bin with a plurality of a second modified form of removable aerators mounted on the floor of the bin.

Fig. 11 is a side elevation of the modified form of removable aerator shown in Fig. 10.

Fig. 12 is a section along the line 12—12 of Fig. 11.

Referring more particularly to the drawings, I have shown a bin, generally designated 1, in the form of an automotive semi-trailer mounted upon wheels 2. Bin 1 is preferably fabricated of sheet steel and comprises front wall 3, rear wall 4, top wall 5, side walls 6, inclined bottom walls 7 and 8, and intermediate inclined bottom walls 9 and 10 which taper downwardly from the front wall 3 toward the rear wall 4 of the bin. Top wall 5 is provided with a suitable hatch with a removable cover (not shown) through which the pulverulent material is loaded into the bin. Two outlet ports 11 and 12 are provided in the rear wall 4 through which the pulverulent material is discharged into a chute 13. As thus far described my bin is identical with that shown in my above copending application.

Bottom walls 8 and 9 and 7 and 10 are reinforced throughout their lower edges with a plurality of spaced parallel metal tie rods 14, the ends of which are welded to the bottom walls as at 15. The lower edge portions of bottom walls 7 to 10 are each reinforced with metal plates 16 welded thereto.

The extreme bottom of bin 1 takes the form of two converging channels or troughs, generally designated 17 and 18, which converge at the outlets 11, 12 of rear wall 4. Troughs 17 and 18 are identical so a description of the one will apply equally well to the other. Each trough 17, 18 comprises side walls in the form of steel channels 20 and 21 which are welded along their top edges to plates 16 as at 22. A heavy steel plate 23 forms the bottom wall of each trough. Plate 23 is welded as at 24 to the lower edges of side channels 20 and 21 and is also welded to the outer edges of these channels as at 25. Thus, each trough 17 and 18 contributes materially to the structural strength and rigidity of the bin.

My removable aerator unit is shown in perspective in Fig. 8 and comprises an elongated channel 26 of thin sheet steel, for example, eighteen gauge. Channel 26 preferably is closed at each end and is provided with a flange 27 which extends completely around the periphery of channel 26. Channel 26 is reinforced throughout its length by a plurality of tie rods 29 which extend across the channel and are welded at their opposite ends to the side walls of the channel 26 adjacent their upper edges.

Since the aerator is designed to supply air, preferably at a low pressure, in the neighborhood of from about .8 to about 2 pounds per square inch, the upper wall 30 of the aerator is made of a porous medium. The porous medium 30 should have a sufficiently high resistance to the flow of air or other gas therethrough so that the flow of air through the porous wall will be uniform throughout the entire area of the porous wall and will not be affected by the body of pulverulent material which will be supported upon the porous wall. In other words, the porosity or resistance to flow of the porous medium 30 must be such that the flow through porous medium 30 will be substantially uniform throughout the entire area of the porous wall 30 even though portions of the wall are covered by pulverulent material and the remaining portions uncovered. If the distribution or flow of air through the porous medium is affected by the pulverulent material thereon, then the bin will not completely unload or clear itself of pulverulent material when operated because as soon as a portion of the porous wall 30 is uncovered the air will flow through the uncovered portion and bypass that portion of the porous medium 30 which is covered with pulverulent material and flow of pulverulent material will stop. Thus, to obtain the required resistance to flow, I have found that it is essential to fabricate the porous wall 30 of any suitable porous medium having a resistance to flow of the order of that of two to eight ply canvas belting. I have found that woven fabric material or webbing, such, e. g., as canvas belting, is superior in many respects to any other form of porous medium, such as porous filter stone or porous brick. Woven fabric material such as canvas belting, is flexible and unbreakable and therefore lends itself admirably to the manufacture of aerators. Porous filter stone or porous silica block can be used but such porous medium is frangible. In the conveying of hot materials (e. g., 250° F.) porous blocks also will often crack or break due to the different thermal expansion rates of such porous block and its steel support. Such condition will not affect the fabric because it can stretch. The canvas belting, due to its flexibility, will maintain its porosity and will readily clean itself when set in operation after a long period of inoperativeness whereas the porous stone or brick tends to change in porosity and to clog, particularly if operation is suspended for a substantial time in humid weather.

Another advantage of the canvas belting is that it lends itself much more readily to fabrication of curved or broken line type aerator conveyors than does the porous block. Due to the flexibility of the canvas belting, it can be subjected to considerable pounding, such as occurs frequently in the running of my mobile self-unloading bin over the highway, without breakage or destruction whereas similar usage would cause the porous stone or brick to break and thereby destroy its usefulness. Further, in shipment or handling my aerator with the canvas belting as the porous medium will stand up where an aerator with porous brick or block would be damaged or practically destroyed.

In fabricating my aerator the web or length of canvas belting 30 is drawn taut and clamped along its edges between angle irons 31 and flanges 27 which are secured together by bolts 32. Canvas belting 30 is also clamped at each end between metal plates 33 and flange portion 27 which are also secured together by bolts. An elongated aerator unit fabricated as shown in particular in Fig. 8 is now slid through openings 11 and 12 into each of the troughs 17 and 18 provided therefor. It will be noted that the lower portion of each opening 11 and 12 extends completely between the side walls 20 and 21 of troughs 17 and 18 and that the upper portion of each opening 11 and 12 is somewhat narrower and extends between the lower edges 34 of the bottom walls 8, 9 and 7, 10. The outer end of each trough 17, 18 is provided with a narrow flange 35 which engages behind the outer end of each aerator to retain the same in its respective channel. Openings 11 and 12 will be provided with doors (not shown) which will be closed when the self-unloading bin is not in operation or being loaded.

The bottom wall 23 of each channel is provided with an opening 36 through which a nipple 38 projects. Nipples 38 are secured to the bottom wall of aerator channel 26 (Fig. 5). A flexible air line or hose 37 is secured to each nipple 38 by coupling 40. Lines 37 are connected to a main air supply line 41 which is supplied with air under pressure by blower 42 driven by an auxiliary internal combustion engine 43. The floor of each trough 18 will be inclined downwardly toward outlet openings 11 and 12 at an angle of about five degrees and, of course, the aerator and canvas wall 30 will have a corresponding inclination. A larger angle of inclination can be used but only at the cost of storage space in a bin having any given overall height. The joint between side walls 20 and 21 and flanges 31 is sealed throughout the length of the aerator by a distortable seal such as rubber tubing 47. Rubber or otherwise flexible tubing 47 also serves as an anti-rattler for holding the aerator in position within its supporting trough. Rubber tubing 47 will be held in compression between side walls 20 and 21 and flanges 31 but can be readily removed whenever it is desired to remove an aerator from its channel housing or receptacle.

It should be noted that the distance between upstanding flanges 31 of each aerator is at least equal to the distance between lower edges 34 of the bin bottom walls 8, 9 and 7, 10. Thus, all of the cement or pulverulent material which flows or slides down the bottom walls is assured of being deposited upon the porous wall 30 of the aerator and therefore the bin will completely unload itself. This is important, particularly where different kinds of powdered materials are being stored or transported in the bin. Since the bin completely unloads itself, it is never necessary for one to get in the bin and clean it out. If the bin did not completely unload itself, then after carrying one grade of cement it would be necessary to enter the bin and shovel or sweep out the residual cement before the bin could be loaded with a different grade of cement or other powdered material.

In operation the blower 42 supplies air at low pressure, for example, .8 to 2 pounds per square inch through lines 41 and 37 to each aerator. This low pressure air flows uniformly through canvas belting 30 throughout its entire area and aerates the pulverulent material on said canvas belting. This causes the aerated pulverulent material to flow down the inclined porous wall 30 and through outlets 11, 12 into chute 13. The inclination of bottom walls 7, 8, 9 and 10 is sufficient so that the powdered material will flow by gravity down these bottom walls and be deposited upon the aerators which in turn aerate the powdered material and cause it to flow down the aerators and be discharged through the outlet end of the bin.

In Fig. 9 I have shown a slightly modified form of aerator 48 which is identical in every respect with aerator 26 except that upstanding flanges 49 are made of spring metal. Since flanges 49 are in tension between walls 20 and 21, they also serve to hold the aerator securely in position and against rattling within its supporting trough. The upper edges 50 of flanges 49 in their unstressed condition are spread apart a distance slightly greater than the width of trough 18. Hence, when aerator 48 is dropped into trough 18 the flanges 49 are flexed inwardly toward each other from the dotted line to the full line position shown in Fig. 9, by the side walls 20 and 21 of trough 18 to thereby effect a powder-proof seal between flanges 49 and the side walls of the troughs. In this form of the invention the lower edges 34 of the bottom side walls 7, 8, 9 and 10 extend along the upper edges of the side walls of each trough 17, 18.

In unloading the powdered material from the bin the powdered material will flow from the bottom side walls 7, 8, 9, 10 on to flanges 49 and thence on and down porous wall 30 of each aerator.

In Figs. 10 to 12 I have shown a stationary bin 55 having a central discharge outlet 56 through which the powdered material stored in the bin 55 is discharged. To effect discharge of this powdered material, I have positioned a plurality of aerators 57 radially about opening 56. Each aerator 57 is supported at its forward end upon the floor 59 of the bin and the rear end is carried by a support 58 of sufficient height to incline each aerator at an angle of about five degrees. Aerator 57 is constructed the same as aerator 26 except that the upstanding flanges 31 have been omitted. Air is supplied at low pressure to each aerator 57 by air lines 60. This low pressure air aerates the powdered material and causes it to flow down the porous wall 30 of each aerator and thence through discharge opening 56. These aerators 57 will discharge pulverulent material from bin 56 until the level of the pulverulent material reaches the level of porous wall 30. The remaining pulverulent material on the floor 59 beneath the porous wall 30 can be shoveled or otherwise discharged through opening 56 to complete the unloading of bin 55.

During the unloading of the bin the pulverulent material above porous wall 30 of each aerator will form its own channel down which the aerated cement flows. This type of portable aerator is very useful in converting gravity and manually unloading bins to what amounts to a self-unloading bin from the practical viewpoint:

I claim:

1. A bin adapted to receive pulverulent material and having a discharge outlet in a wall thereof, a trough in the floor of the bin and below the level of the material-supporting portions thereof, said trough extending from adjacent the discharge outlet to a point adjacent a side wall of the bin, an aerator for supplying a gaseous medium to the pulverulent material independently if and removably mounted in said trough, said aerator comprising an elongated channel, walls closing the ends of the channel, and a porous wall closing the top of the channel and inclined downwardly toward the discharge outlet, said channel having an inlet through which a gas under pressure can be introduced into the channel for passage upwardly through the porous wall, said porous wall being adapted to form a support for pulverulent material to be aerated by gas passing upwardly through the porous wall and a way along and upon which aerated pulverulent material may flow toward said discharge outlet.

2. The combination claimed in claim 1 wherein the porous wall closing the top of the channel of the aerator is of woven fabric.

3. The combination claimed in claim 1 wherein the depth of said trough is greater than the height of said aerator whereby the porous wall of the aerator is positioned below the upper edges of said trough.

4. The combination claimed in claim 3 wherein the floor of said bin inclines upwardly and outwardly from said trough.

5. The combination claimed in claim 4 wherein the said trough terminates at the side wall of the bin, and an opening is in the side wall of the bin through which the removable aerator can be moved lengthwise into said trough.

6. A bin adapted to receive pulverulent material and having a discharge outlet in a wall thereof, a trough in the floor of the bin and below the level of the material-supporting portions thereof, said trough being generally in the form of a channel and terminating adjacent said discharge outlet, the floor of the bin being inclined outwardly and upwardly from the upper edges of said trough, whereby pulverulent material can flow along the inclined floor portions into said trough, an aerator unit for supplying a gaseous medium to the pulverulent material independent of and removably positioned on the floor of the trough, said aerator unit comprising an elongated channel, walls closing the ends of the channel and a porous wall closing the top of the channel and inclined downwardly at a small angle toward the discharge outlet, said channel having an inlet through which a gas under pressure can be introduced into the channel for passage upwardly through the porous wall, said porous wall being positioned below the level of the upper edge of said trough and being adapted to form a support for pulverulent material to be aerated by gas passing upwardly through the porous wall and a way upon and along which aerated pulverulent material may flow towards said discharge outlet.

7. The combination claimed in claim 6 wherein the porous wall of said aerator is a woven fabric web.

8. The combination claimed in claim 6 wherein the porous wall of said aerator is a web of multiple ply canvas.

9. The combination claimed in claim 7 wherein the aerator is provided with generally upright flanges along its longitudinal edges above said porous medium, and means for effecting a seal between said flanges and the side walls of said trough whereby the pulverulent material flowing down the inclined floor of said bin is deflected by the upstanding flanges on to the porous wall of the aerator to thereby facilitate substantially complete unloading of the bin.

10. The combination claimed in claim 9 wherein said seal is in the form of a distortable member held in compression between the upstanding flanges of the aerator and the side walls of the trough.

11. The combination claimed in claim 10 wherein the lower edge portions of the floor overhang the side walls of said trough to thereby deliver the pulverulent material on to the porous wall of the aerator.

12. In a bin adapted to receive pulverulent material and having a discharge outlet in the lower portion of a wall thereof, a trough in the floor of the bin and below the level of the material-supporting portions thereof, said trough extending from adjacent the discharge outlet to a remote wall of the bin, an aerator for supplying a gaseous medium to the pulverulent material independent of and removably mounted in said trough, said aerator being substantially co-extensive in length with the trough and comprising an elongated box, the upper wall of which is porous and inclines downwardly toward the discharge outlet, said box having an air inlet through which a gas under pressure can be introduced into the box for passage upwardly through the porous upper wall thereof, said porous wall being adapted to form a support for pulverulent material to be aerated by gas passing upwardly through the porous wall and a way upon and along which aerated pulverulent material may flow toward said discharge outlet.

13. The combination set forth in claim 12 wherein the bottom, side and end walls of said aerator are sheet metal and the porous top wall is in the form of a woven fabric web, resilient flanges extending upwardly and outwardly from the longitudinal upper edges of said aerator, the upper edges of said flanges contacting the side walls of the trough whereby the flanges are held in tension, said flanges serving to direct the pulverulent material from the floor of the bin on to the porous wall of said aerator.

HENRY RIPLEY SCHEMM.

REFERENCES CITED

The following references are of record in the file of this patent:

UNITED STATES PATENTS

| Number | Name | Date |
|---|---|---|
| 1,971,852 | Goebels | Aug. 28, 1934 |
| 1,971,853 | Ihlefeldt | Aug. 28, 1934 |
| 2,011,133 | Yoss | Aug. 13, 1935 |
| 2,316,814 | Schemm | Apr. 20, 1943 |

FOREIGN PATENTS

| Number | Country | Date |
|---|---|---|
| 64,020 | Denmark | Oct. 8, 1945 |
| 808,124 | France | Jan. 29, 1937 |